US006330550B1

United States Patent
Brisebois et al.

(10) Patent No.: US 6,330,550 B1
(45) Date of Patent: Dec. 11, 2001

(54) CROSS-MEDIA NOTIFICATIONS FOR E-COMMERCE

(75) Inventors: Michel A. Brisebois; Jobe Roberts, both of Wakefield; Michael Weisskopf, Stittsville, all of (CA)

(73) Assignee: Nortel Networks Limited (CA)

( * ) Notice: Subject to any disclaimer, the term of this patent is extended or adjusted under 35 U.S.C. 154(b) by 0 days.

(21) Appl. No.: 09/222,926

(22) Filed: Dec. 30, 1998

(51) Int. Cl.[7] .................................................. G06F 17/60
(52) U.S. Cl. .............................. 705/75; 705/40; 705/44; 705/26
(58) Field of Search .................... 705/1, 53, 56, 705/75, 26, 40, 44; 709/229; 713/155, 200, 201, 202

(56) References Cited

U.S. PATENT DOCUMENTS

| | | | |
|---|---|---|---|
| 5,544,246 | * | 8/1996 | Mandelbaum et al. ................ 705/65 |
| 5,710,887 | * | 1/1998 | Chelliah et al. ....................... 705/26 |
| 5,715,399 | * | 2/1998 | Bezos .................................... 705/27 |
| 5,794,207 | * | 8/1998 | Walker et al. ........................... 705/1 |
| 5,819,029 | * | 10/1998 | Edwards et al. ..................... 713/200 |
| 5,903,652 | * | 5/1999 | Mital ..................................... 705/78 |
| 5,903,721 | * | 5/1999 | Sixtus ................................. 713/201 |
| 5,903,878 | * | 5/1999 | Talati et al. ............................. 705/26 |
| 5,960,411 | * | 9/1999 | Hartman et al. ....................... 705/26 |
| 5,963,915 | * | 10/1999 | Kirsch ................................... 705/26 |
| 5,999,967 | * | 12/1999 | Sundsted ............................. 709/206 |
| 6,000,832 | * | 12/1999 | Franklin et al. ..................... 700/232 |
| 6,016,482 | * | 1/2000 | Molinari et al. ....................... 705/35 |
| 6,018,724 | * | 1/2000 | Arent .................................... 705/44 |
| 6,047,051 | * | 4/2000 | Ginzboorg et al. .................. 379/130 |
| 6,047,268 | * | 4/2000 | Bartoli et al. .......................... 705/35 |
| 6,049,785 | * | 4/2000 | Gifford ................................. 705/39 |
| 6,055,505 | * | 4/2000 | Elston ..................................... 705/1 |
| 6,064,990 | * | 5/2000 | Goldsmith ............................. 705/75 |
| 6,078,907 | * | 6/2000 | Lamm ................................... 705/40 |
| 6,092,053 | * | 7/2000 | Boesch et al. ......................... 705/26 |
| 6,195,542 | * | 2/2001 | Griffith ................................. 455/506 |

FOREIGN PATENT DOCUMENTS

0845749 A  *  6/1998  (EP) ...................................................

OTHER PUBLICATIONS

Zeheb, D., "Secretarial Branch Exchange," IBM Technical Disclosure Bulletin, vol. 26, No. 5, pp. 2645–2647, Oct. 1983.*
Lange, L., "E–Cash Coming? Bank on it," Electronic Engineering Times, No. 889, p. 100. Feb. 19, 1996.*
Borenstein, N.S., "Perils and Pitfalls of Practical Cybercommerce," Communications of the ACM, vol. 39, No. 6, pp. 36–44, Jun. 1996.*
Paulson, L.D., "Trends in E–Commerce Probed at Comdex Session," Newsbytes News Network. Nov. 22, 1996.*
McAndrews, J.J., "Making Payments on the Internet," Business Review (Federal Reserve Bank of Philadelphia), pp. 3–14, Jan./Feb. 1997.*
Tweney, D., "Directory Standard Will Be the Linchpin of Business Commerce," InfoWorld, vol. 20, No. 37, p. 46, Sep. 1998.*

* cited by examiner

Primary Examiner—Vincent Millin
Assistant Examiner—Nicholas David Rosen
(74) Attorney, Agent, or Firm—Finnegan, Henderson, Farabow, Garrett & Dunner, L.L.P.

(57) ABSTRACT

Systems and methods consistent with the present invention facilitate a transaction between a user and a party represented by a server on a network. When the user agrees to enter a transaction with the party, the party's server informs a profile server. The profile server stores a user profile tag corresponding to the user, including a unique user identification code, instructions, and user data. Using information in the user profile tag, the profile server confirms that the user wishes to engage in the transaction. After this confirmation, the profile server may complete the transaction.

22 Claims, 9 Drawing Sheets

US 6,330,550 B1

CROSS-MEDIA NOTIFICATIONS FOR E-COMMERCE

BACKGROUND OF THE INVENTION

The present invention relates generally to a system and method for limiting access to confidential information during an e-commerce transaction and more particularly to the use of cross-media to confirm an e-commerce transaction.

One of the greatest deterrents to widespread use of electronic commerce involves consumers' lack of confidence in current techniques used to secure confidential information. Although encryption techniques have been used to prevent third parties from discovering a customer's confidential information, many customers remain reluctant to provide a company with confidential information over the Internet. In particular, some customers are wary that the company will misuse the information by making fraudulent purchases or will sell the information to another company. These wary consumers recognize that in electronic transactions, confidential information such as credit cards numbers, social security numbers, telephone numbers and addresses, can be copied and distributed many times and across several companies with little effort. Accordingly, transactions over the Internet have been primarily limited to reputable companies, making e-commerce difficult for newer companies.

SUMMARY OF THE INVENTION

A method consistent with the present invention for effectuating a secure transaction between a user and a party represented by a web-site comprises several steps. Initially, user profile data, including unique user identification codes, as well as instructions and user data corresponding to the identification codes, are stored in a database. The profile server receives a user identification code and retrieves the instructions corresponding to the user identification code. Thereafter, the profile server performs a confirmation operation in accordance with the retrieved instructions.

A system consistent with the present invention for providing a secure transaction between a user and a party represented by a web-site comprises a profile server, a web-site server and a client. The profile server stores a user profile tag which includes a unique user identification code, user data, and instructions. When a user visits a web-site, the web-site server automatically receives the user's identification code. In requesting access to user data or completion of a transaction, the web-site server provides the user identification code to the profile server. In response, the profile server performs a confirmation operation in accordance with the instructions stored in the user profile tag. Until successful completion of the confirmation process, the server denies the party access to the user data and does not complete the transaction.

Both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of the specification, illustrate presently preferred embodiments of the invention and, together with the preceding general description and the following detailed description, explain the principles of the invention.

In the drawings.

DETAILED DESCRIPTION OF THE INVENTION

Figure 1:
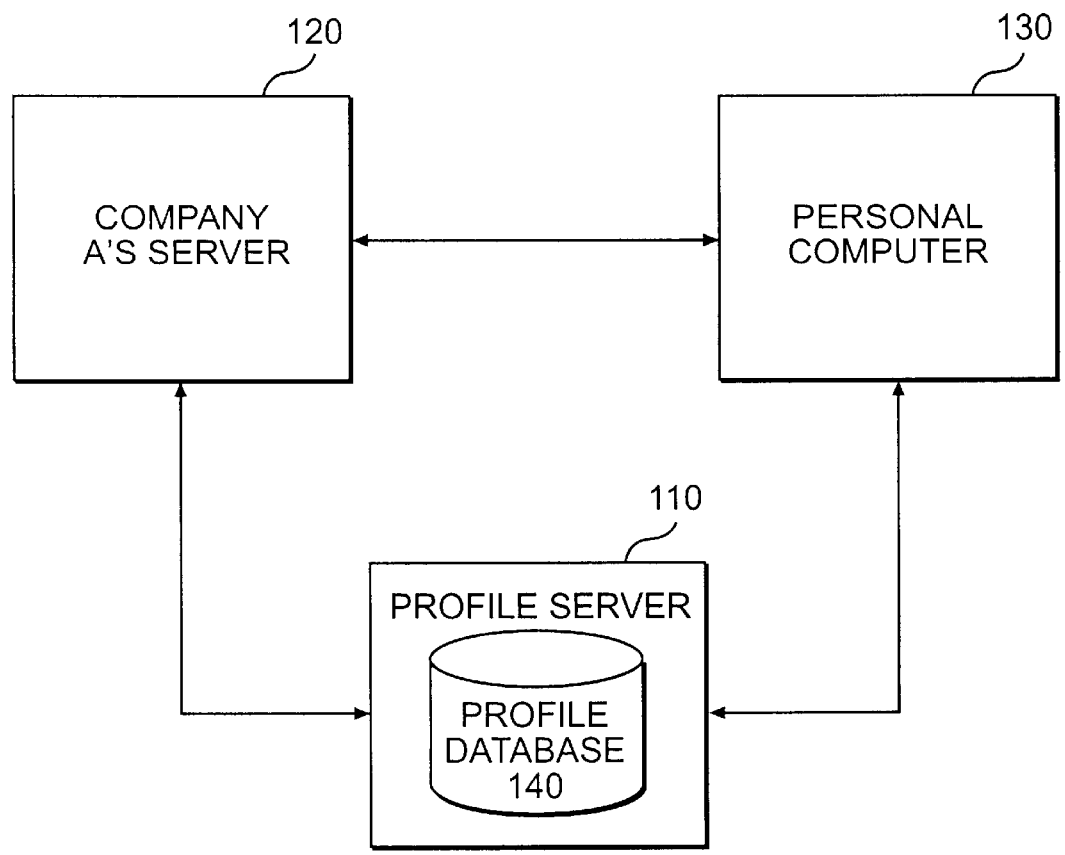
FIG. 1 is a block diagram of a network consistent with the present invention.

Reference will now be made to the present preferred embodiment of the invention, examples of which are illustrated in the accompanying drawings. Where appropriate, the same reference numerals refer to the same or similar elements. The appended claims define the scope of the invention; the following description does not limit that scope.

Systems and methods consistent with the present invention facilitate a transaction between a user and a party represented by a server on a network. When the user agrees to purchase a product from the party, the party's server informs a profile server. The profile server then confirms that the user wishes to engage in the transaction. After this confirmation, the profile server preferably completes the transaction without disclosing confidential information like credit card numbers to the party's server.

FIG. 1 illustrates a generic network consistent with the present invention including a profile server 110, a server 120 for a party that will be engaged in a transaction with a user, and a personal computer 130 for a user. Network elements 110, 120 and 130 are interconnected with information flowing in both directions between each network element 110, 120, 130. Each network element 110, 120, and 130 has a network address. A network consistent with the present invention includes multiple servers 120 and/or multiple personal computers 130 and/or multiple profile servers 110.

Figure 2:
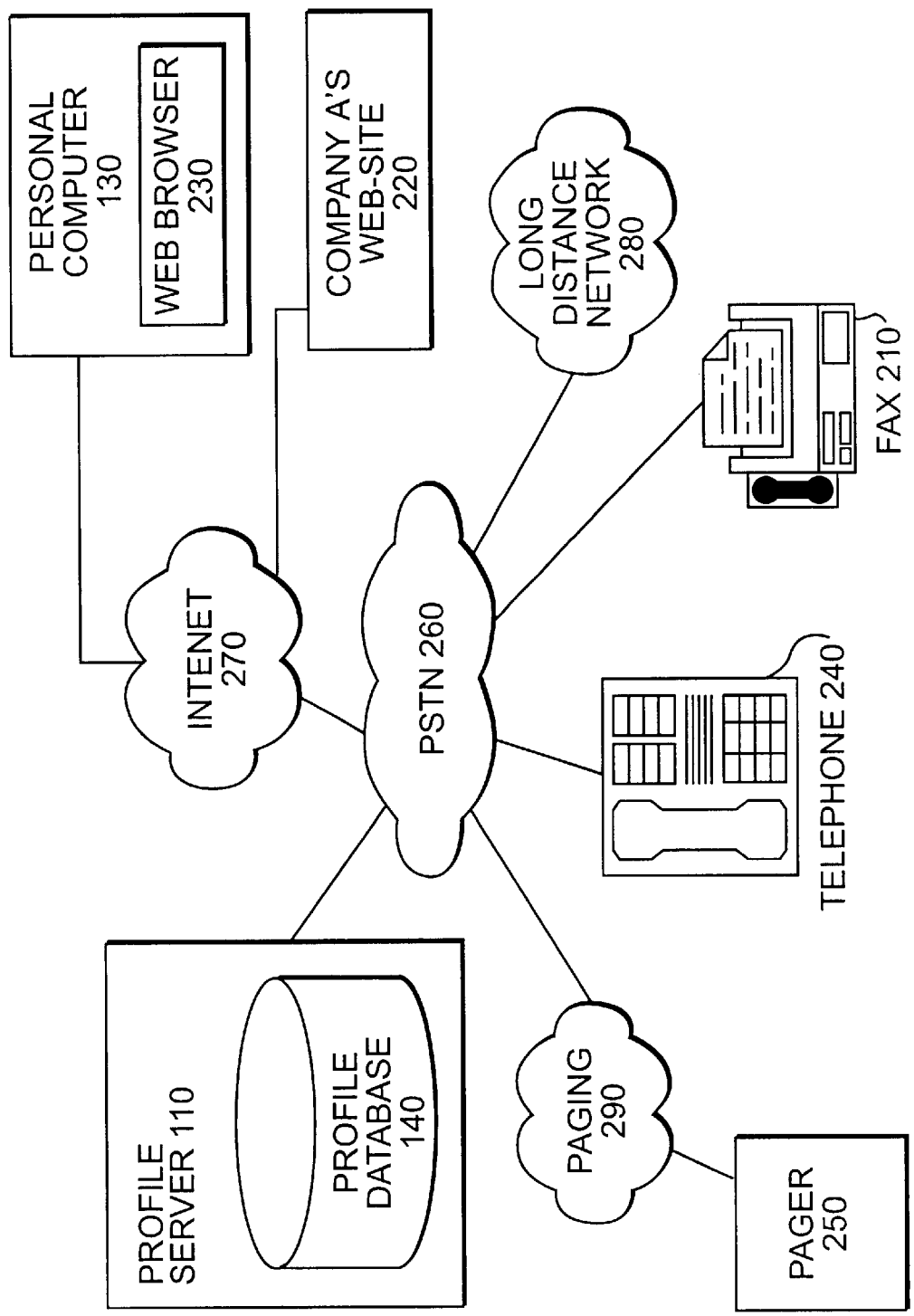
FIG. 2 is a block diagram of a second network consistent with the present invention.

FIG. 2 illustrates an internet system consistent with the present invention. The system includes a profile server 110, a web-site server 220, a personal computer 130 (or any other device giving the user access to the Interenet, such as Internet phone), a facsimile machine 210, a telephone 240 and a pager 250. The profile server 110 interfaces with the web-site server 220 via the Internet 270 and the public switching telephone network (PSTN) 260. The profile server 110 sends the user e-mail messages through the PSTN 260 and the internet 270. The profile server 110 sends voice messages and interactive voice response messages to the user's telephone 240 through the PSTN 260 (and, if necessary, through a second PSTN or through long distance network 280). The profile server 110 sends facsimile messages to the user's facsimile machine 210 via PSTN 260.

Finally, the profile server 110 sends pager messages to the user's pager 250 through PSTN 260 and paging network 290.

The personal computer 130 interfaces with the web-site server 220 via the internet 270. Preferably, web-site server 220 delivers web pages. Each web-site server 220 has an Internet Protocol (IP) address and possibly a domain name. Web browser 230, located in personal computer 130, locates the web-site server 220 and displays the web pages delivered by the web-site server 220. Preferably, the profile server 110 comprises part of an Internet Service Provider's system. Alternatively, the profile server 110 could be part of a separate service subscribed to by multiple users.

Figure 3:
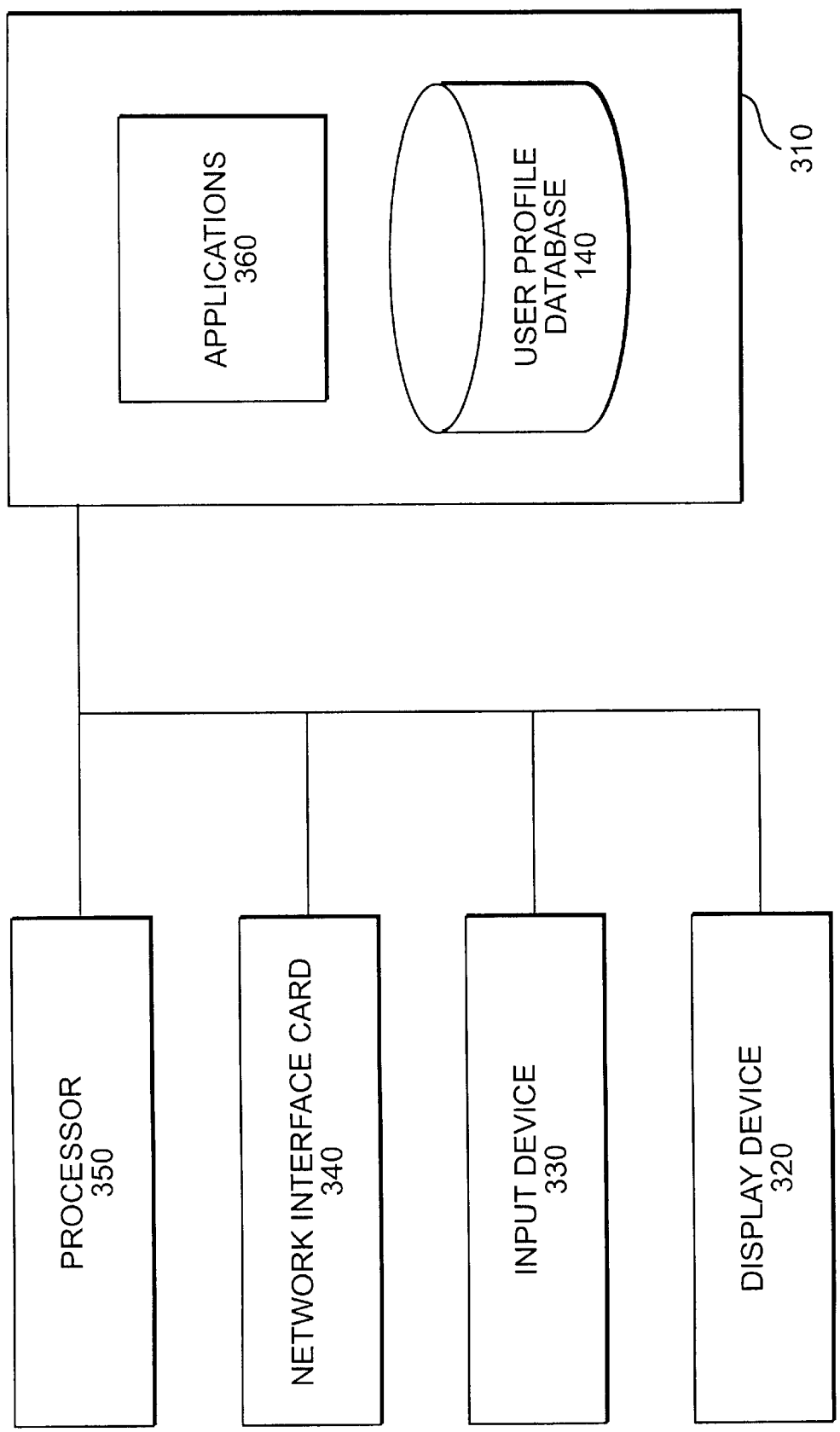
FIG. 3 is a block diagram of the profile server shown in FIG. 2.

FIG. 3 is a block diagram of a profile server 110 consistent with the present invention. In this embodiment, the profile server is implemented in an intelligent peripheral device. The profile server 110 includes a memory block 310, display device 320, input device 330, network interface card 340 and processor 350. Memory block 310 includes application software 360 as well as the user profile database 140. The application software 360 optionally provides traditional services like voice mail, caller identification, call forward, call display and, interactive voice response in addition to the user profile service consistent with the present invention. Among other things, processor 350 retrieves the instructions and user data from the profile database 140. Network interface card 340 connects profile server 110 to PSTN 260.

Profile database 140 stores one or more user profile tags corresponding to one or more users. Preferably, each profile tag includes three parts: a user identification code, instructions, and user data. The user identification code is a unique code that identifies the user. The user data includes public and/or confidential information about the user identified by the user identification code. For example, the user data could include the user's credit card numbers, bank account numbers, social security number, telephone number, e-mail address and mailing address. If desired, the confidential information could be encrypted for additional security.

The instructions in the user profile tag define various functions to be performed by the profile server 110. For example, the instructions may include confirmation instructions for defining the confirmation process that the profile server must follow in response to a request for particular user data from server 120. In the preferred embodiment, the user programs the confirmation instructions. As such, the types of confirmation instructions, and hence the types of confirmation processes, are unlimited. Examples of such confirmation instructions include "send the user an e-mail whenever a party requests access to the user's confidential information," "send the user a voice-mail for every purchase under $50," and "send the user a voice-mail with interactive voice response for every purchase of $50 or more."

Confirmation instructions consistent with the present invention may use cross-media to confirm e-commerce transactions. The term "cross-media" means using different media than the media on which the transaction was initiated. For example, where the user initially agrees to purchase a product from a party represented by a web-site on the internet, cross-media includes all media other than the internet. One of ordinary skill in the art would appreciate that the media employed by the present invention may be any media that would give the user notice. For example, profile server 110 could place a new entry on the user's web page or send the user a pager message, a voice message, a facsimile message or an e-mail message. The use of cross-media adds a real and perceived level of security to electronic transactions and reinforces the relationship between the customer and the party represented by the web-site.

In addition, the instructions stored in the user profile tag might include billing instructions that define the process that the profile server must follow after user agrees to make a purchase and the profile server confirms the transaction. Again, the user preferably programs the billing instructions. Examples of such billing instructions include "send information regarding the transaction to the credit card company," "transfer funds from the user's bank account to the party's bank account," "send the credit card number to the web-site server," and "delay payment until after the user receives the ordered product."

Preferably, the user can modify the instructions at any time. Moreover, the user can define unique confirmation and billing instructions for handling transactions with each individual party. Finally, the profile server 110 may be equipped with default instructions if the user elects to forgo setting his or her own instructions.

A profile tag consistent with the present invention is not limited to the three parts described above. For example, the profile tag might include four parts: a user identification code, instructions, and two levels of user data. The first level of user data might include less confidential information such as the user's name and e-mail address. The second level of user data might include the user's mailing address, telephone number, and credit card number. The user could set different instructions for each level of confidentiality. For example, the confirmation process associated with the user's name and e-mail address could be less demanding than the confirmation process associated with the user's mailing address, telephone number, and credit card number. In this manner, methods and systems consistent with the present invention provide a higher level of security for more confidential data.

Figure 4:
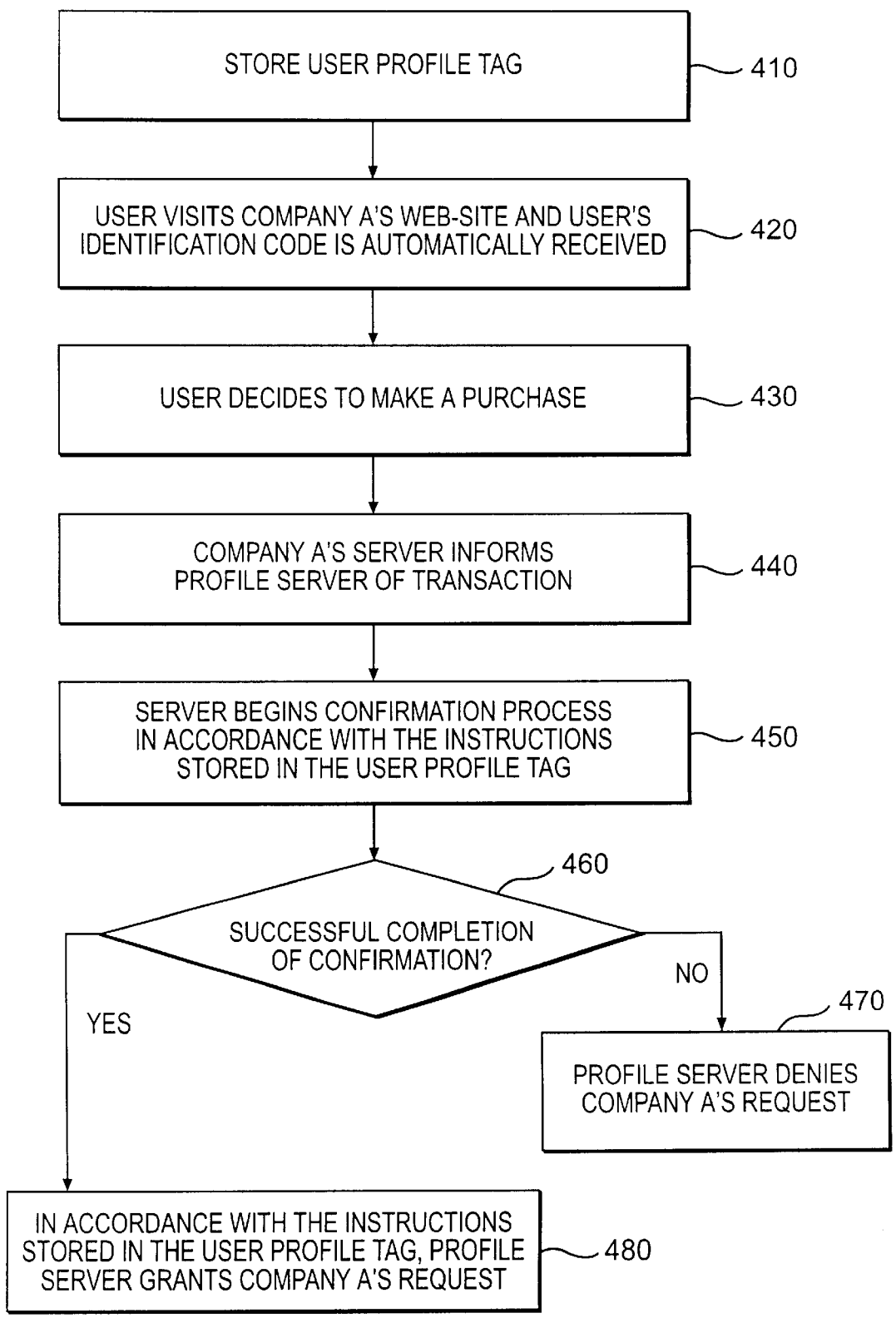
FIG. 4 is a flowchart illustrating the process of limiting access to user data consistent with the present invention.

FIG. 4 illustrates a process consistent with the present invention for providing a secure transaction between a user and a company represented by a web-site on the internet. First, the profile server 110 stores a user profile tag corresponding to the user (step 410). The user visits Company A's web-site using web browser 150 and the web-site server 120 automatically receives the user identification code (step 420).

Step 420 can be implemented by using a tag similar to user preference tags known as "cookies." In this embodiment, the web browser 150 preferably stores a tag containing the address of the profile server 110 as well as the user identification code. The web browser 150 provides this tag to web-site server 120 when the browser 150 requests a page from the web-site server 120. In this manner, the web-site server 120 automatically learns that it can obtain information about the user by providing the user identification code to the profile server 110.

In an alternative embodiment, the user's identification code is identical to the user's IP address. Whenever a user visits a web-site, the web-site server 120 automatically reads the user's IP address. So long as each assigned IP address is unique, the alternative is a viable embodiment. On the other hand, if a user's IP address varies depending on the internet service subscribed to by the user, use of the first embodiment is preferred.

One of ordinary skill in the art would appreciate that systems and methods consistent with the present invention could use any mechanism that would allow web-site server 120 to receive the user identification code. For example, the web browser 150 could include a plug-in application, which runs whenever the user visits a web-site and which provides the user identification code to the web-site server 120.

The user decides to make a purchase using his credit card or some other third party billing plan (step 430). The user also expresses his or her willingness to make the purchase to Company A. Company A's server informs the profile server 110 that the user has agreed to a make a purchase and forwards the amount of the purchase and other relevant data to the profile server 110 (step 440). In response, the profile server 110 initiates a confirmation process in accordance with the instructions stored in the user profile tag (step 450). As noted above, the confirmation process could include an interactive voice response message, such as "send the user a voice mail message with interactive voice response choices to confirm the transaction." Again, because the confirmation process is specified by the user-defined instructions in the user profile tag, the types of confirmation processes that may be performed by the profile server 110 are unlimited.

The profile server takes a different course of action depending on whether the user-defined process confirms the transaction (step 460). If the confirmation process is not successfully completed, the profile server 110 denies Company A's request (e.g., by denying access to the user data) (step 470). If the confirmation process is successfully completed, however, the profile server grants the company's request in accordance with the billing instructions stored in the user profile tag (step 480).

Figure 5:
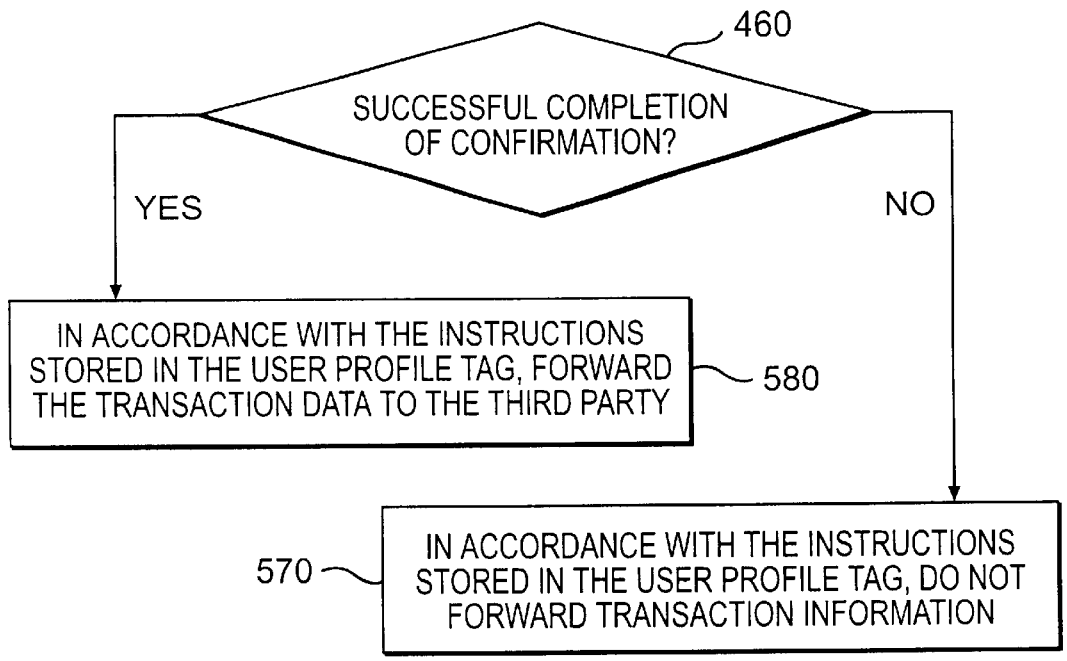
FIG. 5 is a flowchart illustrating a bill-forwarding process consistent with the present invention.
Figure 6:
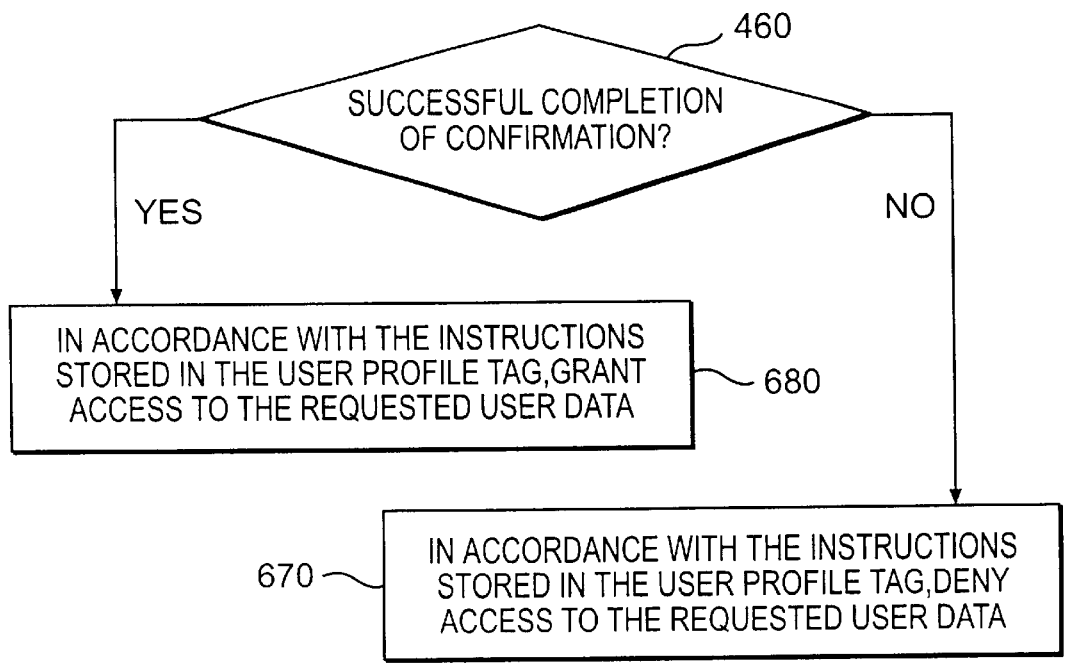
FIG. 6 is a flowchart illustrating a process of limiting access to user data consistent with the present invention.

Because the user can program the billing instructions, the method for handling credit card and other third party billing transactions varies depending on the user's selected preferences. FIGS. 5 and 6 are flowcharts of exemplary billing methods. In the method of FIG. 5, the profile server 110 completes the transaction without sharing the user's confidential credit card information with Company A. Specifically, after successful completion of the confirmation process (step 360), the profile server 110 reads the billing instructions in the user profile tag. In accordance with the instructions, the profile server forwards the user's credit card number, the amount of the purchase, and any other relevant transaction data to the third billing party directly (step 580). In this manner, the user can engage in an e-commerce transaction while maintaining the confidentiality of his or her credit card information. Of course, if profile server 110 does not confirm the transaction, the profile server 110 does not forward the transaction information (step 570).

Users that are comfortable with the release of their credit card numbers may prefer that the profile server 110 simply grant Company A access to the particular user data. In FIG. 6, after successful completion of the confirmation operation (step 460), the profile server 110 provides the requested user data (in this case, credit card numbers) to the web-site server 120 (step 680). Alternatively, in the event of an unsuccessful confirmation operation, the profile server 110 denies the web-site server 120 access to the user data (step 670). Users that are comfortable with granting only certain parties access to their confidential user information could use the method of FIG. 6 for transactions with parties that they trust, while using the method depicted in FIG. 5 for transactions with other parties.

One of ordinary skill would appreciate that in systems and methods consistent with the invention, the user could program the profile server to implement any desired billing method. For example, in a preferred embodiment, the profile service provider (or some other provider) could establish an account system. Preferably, the user would have an account and the party would have an account. In this embodiment, the billing instructions in the user profile tag might provide for the transfer of funds from the user's account to the party's account.

While the preferred embodiment was described primarily with respect to credit card numbers, one of ordinary skill would appreciate that the user data could be any information about the user. For example, Company A's web-site server 120 might request the user's name and e-mail address from the profile server 110. Depending on the instructions stored in the user profile tag, the profile server 110 may perform a confirmation process, such as "e-mail the user whenever a company requests the user's name and e-mail address."

Figure 7:
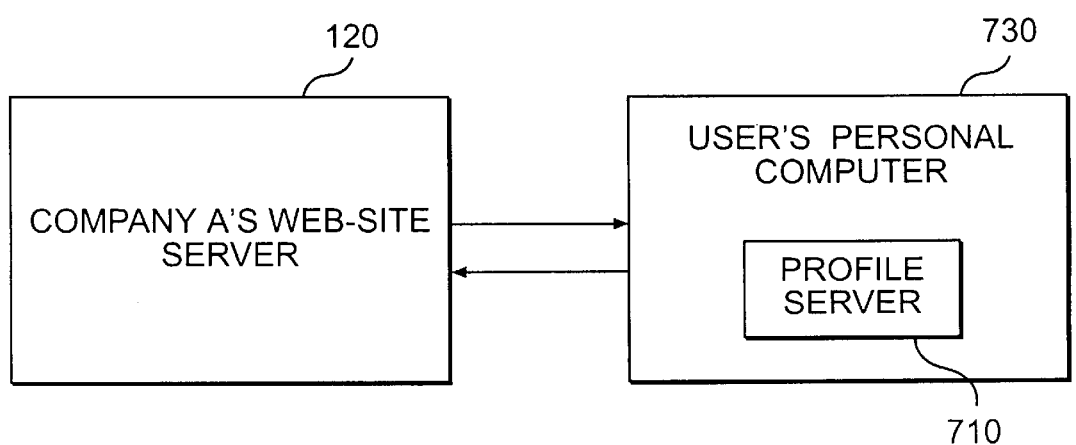
FIG. 7 is a block diagram of an alternative network consistent with the present invention.

In an alternative embodiment consistent with the present invention, the profile server is not a third party server. FIG. 7 shows a profile server 710 in a personal computer 730. The network includes the web-site server 120, the personal computer 730 and the profile server 710. Profile server 710 performs the same functions as profile server 110. For example, profile server 710 stores one or more user profile tags and performs confirmation and billing operations in accordance with user-defined instructions.

Record Keeping

The profile server 110 optionally performs a record keeping function. Specifically, the profile server stores a record every time a party requests information about the user. Using his or her user identification code, the user can access this information. For example, the record could include the name of the party making the request, the date of the request, the specific information requested, and the transaction data provided.

Blocking

After completion of a transaction between the user and Company A, Company A might send the user unwanted solicitations or distribute its customer profile database to another party who in turn might send the user unwanted solicitations. To solve the problem of unwanted solicitations, the profile server preferably blocks unwanted e-mail and telephone calls.

Figure 8:
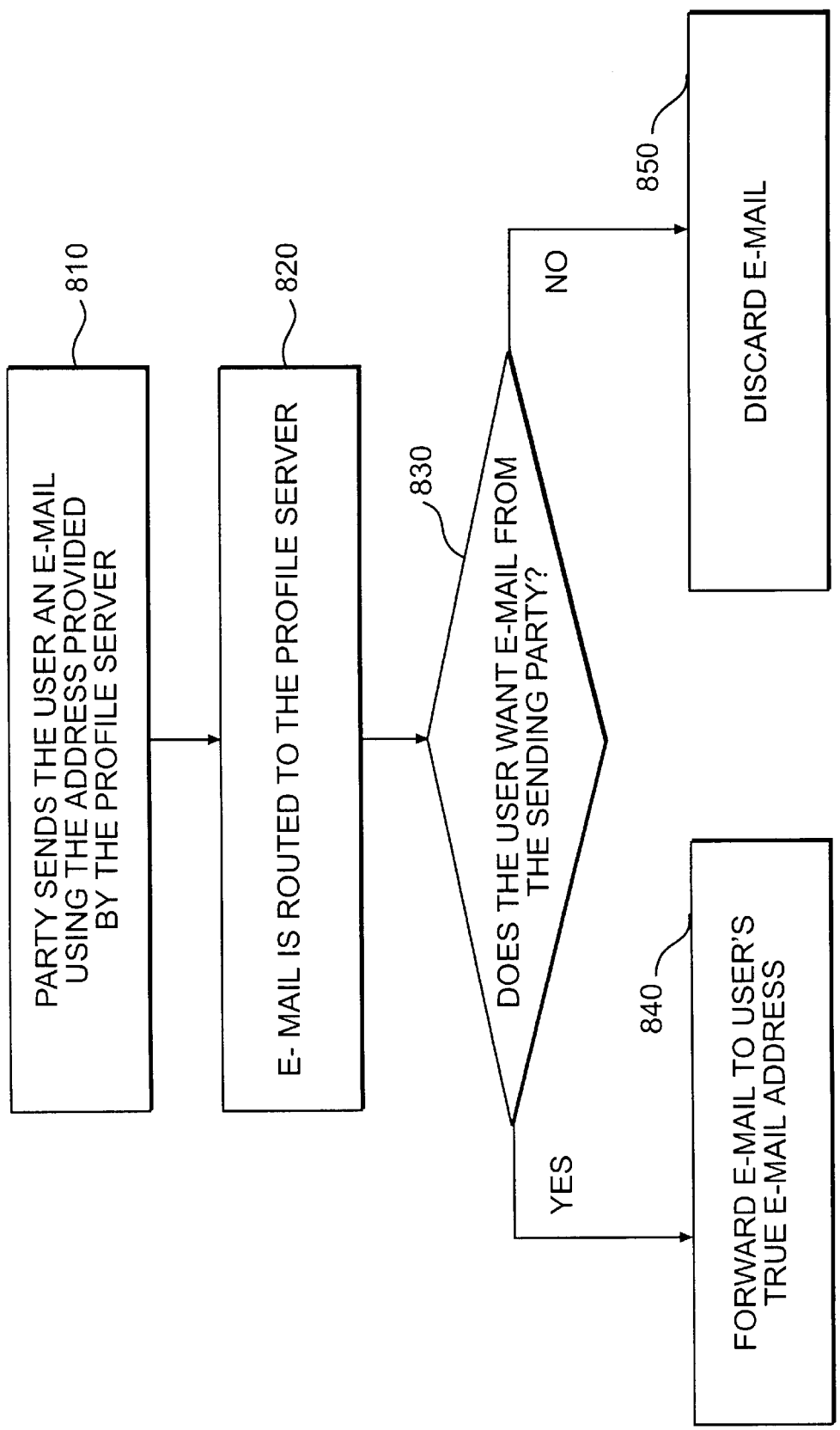
FIG. 8 is a flowchart illustrating a process of blocking unwanted e-mail consistent with the present invention.

FIG. 8 is a flowchart of an e-mail blocking method consistent with the present invention. First, a party sends the user an e-mail using an address originally provided by the profile server 110 (step 810). The address originally provided by the profile server routes the e-mail to the profile server (step 820). This operation is transparent to the party that sent the e-mail.

When the profile server 110 receives the e-mail, it determines whether the customer wishes to receive e-mail from the sending party (step 830). In particular, the profile server 110 retrieves a set of user-defined instructions stored in a user profile tag corresponding to the user. These instructions sort out unwanted e-mail and specify the treatment that the profile server 110 should give the unwanted e-mail. To perform the sorting function, the instructions may take the form of a list of parties that are denied e-mail access or a list of parties that are granted e-mail access. As a default, a list of parties that are granted e-mail access could include anyone that the user initiated contact with by visiting the party's web-site, sending the party e-mail, or calling the party. The profile server discards the unwanted e-mail (step 850) and forwards the wanted e-mail to the user's true e-mail address (step 840). In addition, the profile server could sort the wanted e-mail into different categories for routing into different priority level mail boxes as desired by the user.

Figure 9:
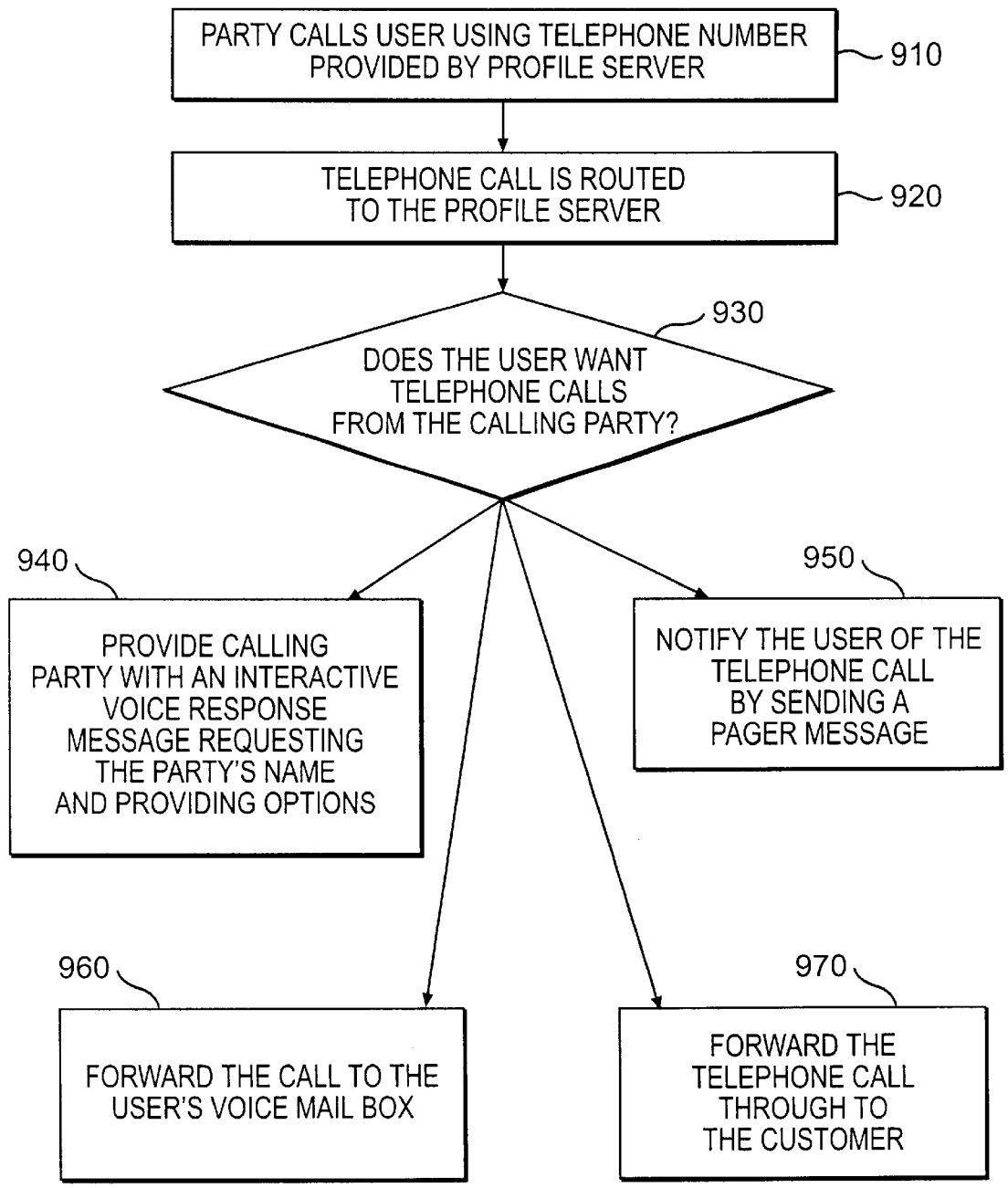
FIG. 9 is a flowchart illustrating a process of blocking unwanted telephone calls consistent with the present invention.

FIG. 9 is a flowchart of a telephone call blocking method consistent with the present invention. First, the party calls the user using the telephone number originally provided to the party by the profile server (step 910). The telephone number provided by the profile server routes the telephone call to a voice application in the profile server 110 (step 920). This operation is transparent to the calling party. The profile server 110 determines whether the user wants to receive the telephone call from the calling party (step 930). Specifically, user-defined instructions (similar to those described in connection with FIG. 8) specify how the telephone call should be treated. Depending on the identity of the calling party and the user-defined instructions, the profile server 110 might provide a interactive voice response message to the party (step 940), send the user a pager message to notify the user of the call (step 950), forward the call to the user's voice mail (step 960), forward the call to the customer (step 970), or take any other viable action programmed by the user.

Systems and methods consistent with the present invention could use an alternative e-mail blocking method. For example, the profile server 110 could periodically send a new key pass to the personal computer 130. To send the user an e-mail, Company A's server 120 would need to provide both the user's e-mail address and the key pass to personal computer 130. Because the profile server 110 frequently updates the key pass, the fact that the profile server 110 gave the user's e-mail address and key pass to Company A today would not mean that Company A could send the user e-mail a month later.

Tracking

In e-commerce, the party represented by a web-site must mail the purchased product to the user. In addition to the functions described above, the profile server can track a purchase for the user. In conventional mail tracking systems, the user must retain a tracking number to access information about a mailed package. Because the tracking number changes for each new package sent, the tracking numbers are easily forgotten or lost. Moreover, the tracking of numerous packages is difficult to administer. Systems and methods consistent with the invention overcome these disadvantages by allowing the user to access information about a mailed package using the user's unique identification code.

Figure 10:
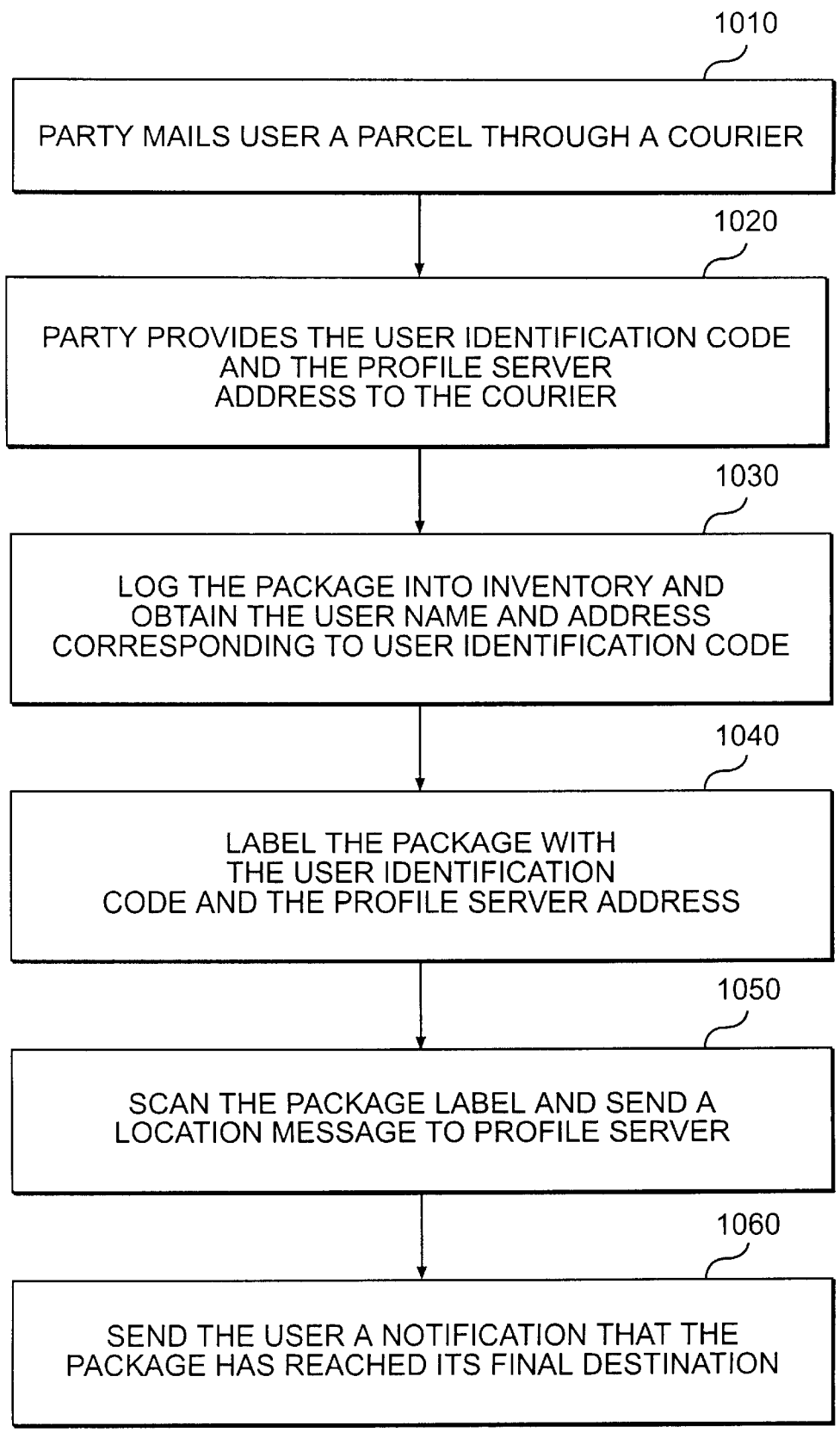
FIG. 10 is a flowchart illustrating a process of tracking the progress of a shipment consistent with the present invention.

FIG. 10 illustrates a tracking method consistent with the present invention. A party mails a parcel to the user through a courier (step 1010). The party provides the profile server address and user identification code to the courier (step 1020). The courier's electronic inventory system logs the parcel into the inventory (step 1030). At the same time, the courier accesses the user's address from the profile server using the method depicted in FIG. 3 (unless the party already provided the name and address). The courier labels the parcel with the profile server address and the user's unique identification code (using a alphanumeric label or a bar code label) (step 1040). As the package is delivered through the courier's system (e.g., from a first mail center to a second mail center), the electronic inventory system scans the package label. Moreover, the electronic inventory system is programmed to send a location message to the profile server each time it scans the bar code or alphanumeric label (step 1050). The profile server logs the location information. The user can access the log information and thereby track the package using his or her user identification code. In step 1060, in accordance with user-defined instructions, the profile server sends the user a cross-media notification that the package has reached its final destination.

While there has been illustrated and described preferred embodiments and methods of the present invention, those skilled in the art will understand that various changes and modifications may be made, and equivalents may be substituted for elements thereof, without departing from the true scope of the invention.

In addition, many modifications may be made to adapt a particular element, technique or implementation to the teachings of the present invention without departing from the central scope of the invention. Therefore, this invention should not be limited to the particular embodiments and methods disclosed herein, but should include all embodiments falling within the scope of the appended claims.

What is claimed is:

1. A method for providing a secure electronic commerce transaction between a client and a server, comprising:

storing a plurality of at least one user profile tags, each user profile tag including a unique user identification code, as well as instructions and user data corresponding to that code;

receiving a user identification code from the server;

reading the instructions corresponding to the received user identification code; and performing a confirmation operation in accordance with the instructions corresponding to the user identification code.

2. The method of claim 1, further comprising denying the server access to the user data until successful completion of the confirmation operation.

3. The method of claim 1, further comprising receiving from the server sufficient information regarding the transaction to complete the transaction.

4. The method according to claim 3, further comprising forwarding the information regarding the transaction to a third billing party after successful completion of the confirmation operation.

5. The method of claim 1, wherein performing a confirmation operation further comprises sending the user a message to notify the user about the transaction.

6. The method of claim 5, wherein performing a confirmation operation further comprises receiving a response from the user.

7. The method of claim 1, wherein performing a confirmation operation further comprises sending a cross-media notification of the transaction to the user associated with the received user identification code.

8. A method for providing a secure electronic commerce transaction between a user and a server in a network having a profile server that stores user profile data including user identification codes, as well as user data and user-specified instructions corresponding to those codes, comprising:

receiving a user identification code;

receiving an agreement to enter into a transaction from the user identified by the code;

providing to the profile server the user identification code; and providing to the profile server sufficient details regarding the transaction to allow the profile server to complete the transaction.

9. The method of claim 8, further comprising receiving a response from the profile server.

10. A profile server for facilitating a secure electronic commerce transaction between a user and a server in a network, comprising:

a database for storing one or more user profile tags, each tag including a unique user identification code, as well as instructions and user data corresponding to that code;

a network interface for receiving a user identification code from the server; and a processor for retrieving from the database the instructions corresponding to the user identification code and performing a confirmation operation in accordance with the retrieved instructions, wherein the instructions include user-specified instructions.

11. The profile server of claim 10, wherein the interface further comprises means for receiving data regarding a transaction between the user and the server.

12. A profile server in accordance with claim 11, further comprising means for forwarding the transaction data to a billing party upon successful completion of the confirmation process.

13. A profile server in accordance with claim 10, wherein the processor further comprises means for notifying the user of the transaction.

14. A profile server in accordance with claim 13, wherein the confirmation means further comprises means for receiving a response from the user.

15. A profile server in accordance with claim 10, wherein the instructions include confirmation instructions and billing instructions.

16. A profile server in accordance with claim 15, wherein the confirmation instructions further include notification instructions.

17. A profile server in accordance with claim 10, wherein the processor further comprises means for sending a cross-media notification of the transaction to the user.

18. A network comprising:

a client operated by a user;

a server connected to the client; and a profile server, connected to the client and the server, for effectuating an e-commerce transaction between the user and the server while limiting access to confidential user data, comprising a database for storing a user profile tag, the user profile tag including a unique user identification code, as well as instructions and user data corresponding to that code wherein the database stores at least one user profile tag including instructions specified by the user.

19. The network of claim 18, wherein the profile server further comprises:

means for forwarding the confidential user data to a third billing party to complete the e-commerce transaction between the user and the server.

20. The network of claim 18, wherein the profile server further comprises:

means for confirming that the user wants to engage in the e-commerce transaction with the server.

21. The network of claim 20, wherein the means for confirming further comprises means for sending a cross-media notification of the transaction to the user.

22. A server connected to a client and a profile server that stores user profile tags, each user profile tag including a user identification code, user specified instructions and user data, the server comprising:

means for receiving a user identification code from the client;

means for receiving, from the user corresponding to the received user identification code, an agreement to enter into a commercial transaction;

means for providing to the profile server the user identification code;

means for providing to the profile server sufficient details regarding the commercial transaction to allow the profile server to complete the commercial transaction.

* * * * *

UNITED STATES PATENT AND TRADEMARK OFFICE
CERTIFICATE OF CORRECTION

| | | |
|---|---|---|
| PATENT NO. | : 6,330,550 B1 | |
| APPLICATION NO. | : 09/222926 | |
| DATED | : December 11, 2001 | |
| INVENTOR(S) | : Brisebois et al. | |

It is certified that error appears in the above-identified patent and that said Letters Patent is hereby corrected as shown below:

In the Claims

Column 8, line 11, cancel the text beginning with "1. A method for providing" to and ending with "code." in column 8, line 22, and insert the following claim:

--1. A method for providing a secure electronic commerce transaction between a client and a server, comprising:
storing a plurality of user profile tags, each user profile tag including a unique user identification code, as well as user-specified instructions and user data corresponding to that code;
receiving a user identification code from the server;
reading the instructions corresponding to the received user identification code; and
performing a confirmation operation in accordance with the instructions corresponding to the user identification code.--

Column 10, line 19, cancel the text beginning with "22. A server connected to a client" to and ending with "to complete the commercial transaction." in column 10, line 32, and insert the following claim:

--22. A server connected to a client and a profile server, the server comprising:
means for receiving a user identification code from the client;
means for receiving, from the user corresponding to the received user identification code, an agreement to enter into a commercial transaction;
means for providing the user identification code to the profile server, wherein the profile server stores user profile tags, each user profile tag including a user identification code, user-specified instructions, and user data;
means for providing to the profile server sufficient details regarding the commercial transaction to allow the profile server to complete the commercial transaction.--

Signed and Sealed this
Twentieth Day of May, 2014

Michelle K. Lee
*Deputy Director of the United States Patent and Trademark Office*